United States Patent [19]
Namiki et al.

[11] 4,382,389
[45] May 10, 1983

[54] RACK AND PINION GEARING

[75] Inventors: Ko Namiki, Sakado; Tokio Iguchi, Hidakamachi; Fumio Haga, Sayama; Masanobu Ishikawa, Sakado, all of Japan

[73] Assignee: Honda Giken Kogyo Kabushiki Kaisha, Tokyo, Japan

[21] Appl. No.: 178,672

[22] Filed: Aug. 15, 1980

[30] Foreign Application Priority Data

Aug. 20, 1979 [JP] Japan .............................. 54-105724

[51] Int. Cl.³ .............................................. F16H 1/04
[52] U.S. Cl. ...................................... 74/422; 280/96
[58] Field of Search .................. 74/422, 500; 280/96

[56] References Cited

U.S. PATENT DOCUMENTS

| 1,790,607 | 1/1931 | Trbojevich | 74/500 X |
| 3,433,501 | 3/1969 | Hertel | 74/500 X |
| 3,753,378 | 8/1973 | Bishop | 74/422 |
| 4,116,085 | 9/1978 | Bishop | 74/422 |
| 4,215,591 | 8/1980 | Bishop | 74/422 |

OTHER PUBLICATIONS

"Gear Handbook", by D. W. Dudley, McGraw-Hill Book Company 1st Edition, Copyright 1962, Library of Congress Cat. Card Number: 61-7304, pp. 1-10 through 1-12.

Primary Examiner—Nile C. Byers, Jr.
Attorney, Agent, or Firm—Irving M. Weiner; Pamela S. Burt; John L. Shortley

[57] ABSTRACT

A rack and pinion gearing comprising a helical rack and a spiral pinion. The rack has a structure defined by a radius, a distance from the axis to tooth crest, a helix angle, and a pressure angle determined from the viewpoint of applied kinematics so as to produce a balancing moment of rotation. The structure keeps the rack free from inclination and rocking about the axis which would otherwise result in a biting effect.

3 Claims, 7 Drawing Figures

RACK AND PINION GEARING

BACKGROUND OF THE INVENTION (1) Field of the Invention

This invention relates to a rack and pinion gearing which can prevent the occurence of "biting" in a rack and pinion type steering mechanism for vehicles and other apparatus.

(2) Prior Art

Taking as an example the rack and pinion type steering mechanism for vehicles disclosed in U.S. Pat. No. 3,433,501 patented on Mar. 18, 1969, various problems attendant a rack and pinion gearing including a rack formed with helical gear-teeth and pinion with spiral gear-teeth are described hereinbelow.

In FIG. 6, of the accompanying drawings a rack and pinion gearing 60 comprises a rack 63 and a pinion 64, through which mechanism a rotational motion transmitted from a steering wheel 61 is converted into a reciprocal linear motion of a rod 62. The rack and pinion gearing of this kind generally used in power steering mechanism performs not only the function of reciprocating the rod 62 linearly for controlling a hydraulic circuit of a power steering device (not shown) but also that of advancing or retreating a control valve (not shown) a minute distance in the axial direction of the steering wheel 61 according to the rotation of a steering shaft 65. To achieve these functions, as shown in FIG. 6, the rack 63 with helical gear-teeth 66 and the pinion 64 with spiral gear-teeth 67 are so arranged that the spiral gear-teeth 67 may intermesh with the helical gear-teeth 66. FIG. 7 is an enlarged view showing this intermeshing. As the steering shaft 65 is rotated, one spiral gear-tooth 67 is brought into contact with a helical gear-tooth 66 of the rack 63 at one point and the rotation of the pinion is converted into a transverse movement of the rack 63 through interaction therebetween at this point. As a result, the pinion 64 with spiral gear-teeth 67 receives a force at the above point of action in the advance or retreat direction.

At such point of contact between the rack and pinion, there often occurs an undesirable "biting" effect. The terminology biting as employed herein relates to the action of the spiral gear-tooth 67 of pinion 64 intermeshing between two adjacent helical gear-teeth 66 of rack 63 and tightly wedging itself therebetween. The aforesaid biting results when, as the point of contact between the helical gear-tooth 66 and the spiral gear-tooth 67 shifts, a moment of rotation is produced about the axis of the rack 63, thereby causing the rack 63 to slightly incline or rock, as shown in FIG. 7. Particularly when the steering wheel 61 is turned while such vehicle is stopped, the biting may undesirably prevent the steering wheel 61 from returning easily, because a force component tending to rotate the pinion 64 becomes maximum at such time thus causing the pinion 64 to bite into the rack 63 with an extremely great force. Furthermore, in a power steering mechanism wherein a control valve for a power-assisting hydraulic cylinder is operated making use of rotational force or transverse movement of the pinion 64, there is usually provided an element for preventing the rack 63 from rocking, such as a spring 68 on the lower side of the rack 63 as shown in FIG. 7, so that the movement of the pinion 64 may be kept from being disturbed by the rocking of the rack 63. Such arrangement, however, leads to drawbacks such as increase in the numbers of elements and production processes, rise in cost and fall of productivity.

The present invention is directed toward effectively solving the foregoing problems attendant conventional rack and pinion arrangements.

SUMMARY OF THE INVENTION

An object of the present invention is to provide a rack and pinion gearing including a helical rack and a spiral pinion wherein the helical rack meets the following relation:

$$\frac{R_k}{L_k} \leq \sqrt{\frac{1}{1 + \left(\frac{\sin \beta}{\tan \alpha_n}\right)^2}}$$

where $L_k$ = the radius of the helical rack, $R_k$ = the distance from the axis to tooth crest of the helical rack, $\beta$ = the helix angle of gear-teeth of the helical rack, and $\alpha_n$ = the pressure angle of gear-teeth of the helical rack.

An object of the present invention is therefore to restrict the inclination and rocking of the rack in rack and pinion gearing from the view point of applied kinematics to prevent the aforesaid biting, by use of a rack and pinion gearing meeting the above relation.

Another object of the present invention is to improve the smoothness of steering action and the comfort of operation by applying the rack and pinion gearing in accordance with the invention to, e.g., a power steering mechanism of a vehicle.

Still another object of the present invention is to prevent the inclination and rocking of the rack, which otherwise would occur in rack and pinion gearings for use in a rack and pinion type power steering mechanism for vehicles. At the same time, the invention provides a less costly simplified structure and production process and, thereby facilitating mass production of the power steering mechanism.

The above and further objects and advantages of the present invention will become more apparent from the following detailed description, when read in conjunction with the accompanying drawings.

DETAILED DESCRIPTION OF PREFERRED EMBODIMENTS

Figure 1:
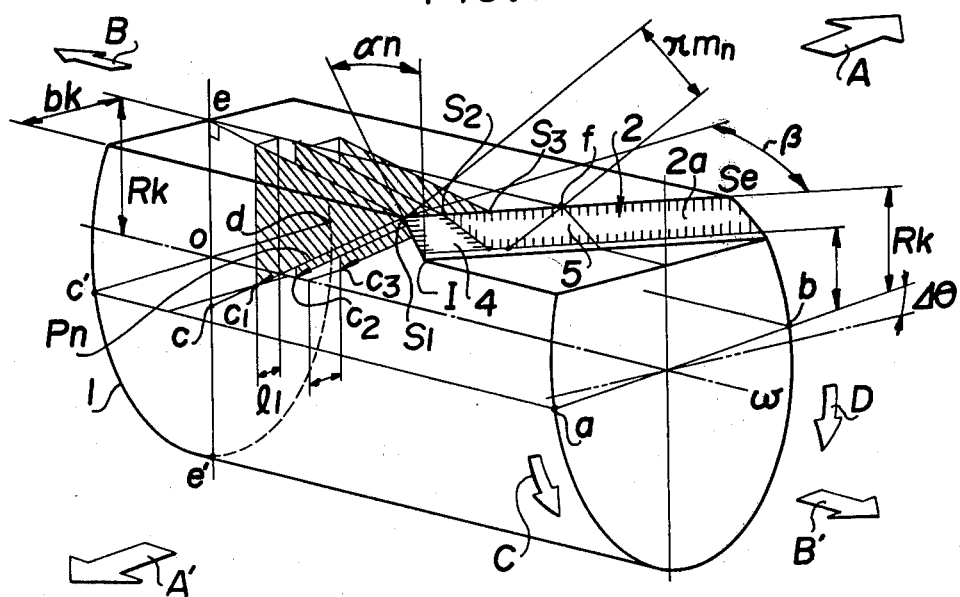
FIG. 1 is a partial perspective view of a rack showing structural parameters and designating geometric symbols.

Referring to FIG. 1, a rack 1 having a substantially cylindrically-shaped body is hobbed at a normal pitch of $\pi m_n$ with a helical gear-tooth 2 having a tooth surface 2a. When the helical gear-tooth 2 meshes with a spiral gear-tooth, they contact at one point. Through this contact point both teeth act on each other. The contact point moves changing its location and disappears.

Figure 7:
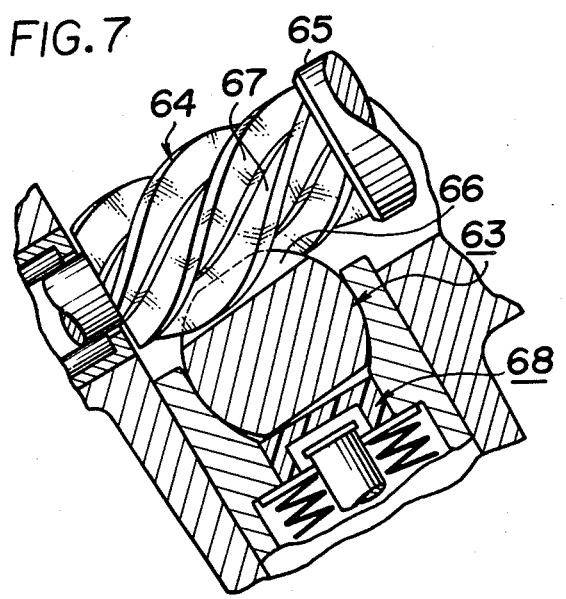
FIG. 7 is a view for explaining problems attendant a prior known rack and pinion gearing.

The helical gear-tooth 2, which has a helix angle $\beta$ and a pressure angle $\alpha_n$, permits a pinion (not shown) to relatively move along the direction of arrow A and the rack 1 along the direction of arrow B in FIG. 1. When the helical gear-tooth 2 starts meshing with the spiral gear-tooth from a contact point $s_1$ located at the left end of the gear-tooth 2, a load $P_n$ acts on the contact point $s_1$ in a normal direction of the tooth surface 2a, which line of action passes through a point $c_1$ on a horizontal plane "a b c' d" including a central axis w. In FIG. 7, the point $c_1$ is located on the forward side of the central axis w. Thus, the load Pn on the point $s_1$ gives rise to a counterclockwise moment C of rotation in accordance with its corresponding component. But, when the contact point moves to the point $s_2$ in FIG. 1, no moment of rotation is produced because the line of action passes through a pont $c_2$ on axis w. In case the load Pn acts on the point $s_3$ in FIG. 1, the line of action passes beyond the central axis w through a point $c_3$ on the plane "a b c' d" thus causing a clockwise moment D of rotation.

In view of the above, the surface 2a is divided into two areas: an area 4 causing counterclockwise moment C of rotation and an area 5 causing clockwise moment D of rotation.

Such clockwise and counterclockwise moments of rotation, if unbalanced, cause the rack 1 to incline or rock about its axis. Therefore, the rack 1 according to the present invention is designed so as to achieve a state in which the clockwise and counterclockwise moments are well-balanced. As clear from FIG. 2, a component of the load Pn in the direction A tends to rotate the rack clockwise. Therefore, by forming the rack 1 such that counterclockwise moment is properly produced to balance the above tendency of clockwise rotation, the inclination and rocking of the conventional rack and hence the biting can be prevented. In other words, by forming the rack 1 such that the contact point moves through the area 4 which causes counterclockwise moment, it becomes possible to avoid the biting. In this context, the area 4 may be referred to as nonbite area E and the area 5 as anti-nonbite area F.

The condition upon which the contact point can be found in the nonbite area E will now be discussed.

Figure 2:
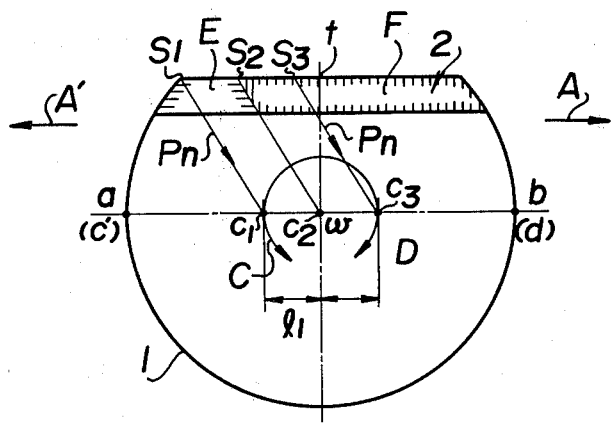
FIG. 2 is a vertical sectional view of the rack for explaining the action of moment.
Figure 4:
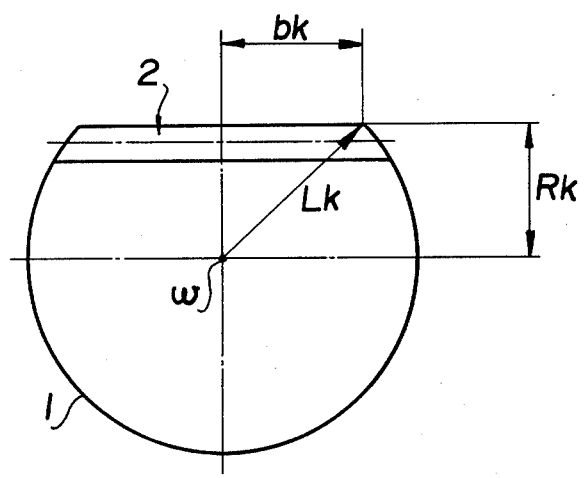
FIG. 4 is a view showing structural parameters of the rack.

In FIG. 2, for permitting the contact point to be found in the nonbite area, it is sufficient that the point $c_1$ comes on the left side of the axis w or on the axis w itself. When assuming $\overline{w c_1} = l_1$, $l_1 \geq 0$ is the requirement for finding the point $c_1$ on the left side of or on the axis w. Next, there is determined a relation to meet the above requirment $l_1 = 0$ in view of the structural parameters of the rack 1, i.e., a radius $L_k$ of the rack 1 and a distance $R_k$ from the axis w to teeth crest as shown in FIG. 4, and a helix angle $\beta$ and a pressure angle $\alpha_n$ of the helical geartooth 2 as shown in FIG. 1.

As will be understood from FIG. 1, by using the symbols designated therein, $$\overline{s_1 e} = \frac{b_k}{\sin \beta} \quad (\because \angle es_1 s_2 = 90°)$$

$$\overline{ec} = \overline{s_1 e} \tan \alpha_n \quad (\because \angle Is_1 c = 90° \text{ and } \angle cs_1 e = \alpha_n)$$

$$= \frac{b_k \tan \alpha_n}{\sin \beta}$$

$$\overline{wc} = \overline{ec} - \overline{eo}$$

$$= \frac{b_k \tan \alpha_n}{\sin \beta} - R_k$$

$$\overline{oc_1} = \frac{\overline{oc}}{\tan \alpha_n} \quad (\because \angle cc_1 o = \alpha_n)$$

Accordingly, $l_1 = \overline{oc_1} \sin \beta$     (1)

$$= \frac{\frac{b_k \tan \alpha_n}{\sin \beta} - R_k}{\tan \alpha} \times \sin \beta$$

$$= b_k - R_k \frac{\sin \beta}{\tan \alpha_n}$$

Since $l_1 \geq 0$, $b_k - R_k \frac{\sin \beta}{\tan \alpha_n} \geq 0$     (2)

From FIG. 4, $b_k^2 = L_k^2 - R_k^2$     (3)

From the relation (2), $b_k \geq R_k \frac{\sin \beta}{\tan \alpha_n}$

Raising both sides to the second power, $b_k^2 \geq R_k^2 \left(\frac{\sin \beta}{\tan \alpha_n}\right)^2$ Substituting the equation (3), $$\frac{R_k}{L_k} \leq \sqrt{\frac{1}{1 + \left(\frac{\sin \beta}{\tan \alpha_n}\right)^2}} \quad (4)$$

Therefore, when $L_k$, $R_k$, $\beta$ and $\alpha_n$ meet the relation (4), $l_1 = 0$ and counterclockwise moment of rotation is produced.

In a precise examination of the biting, as the rack 1 still rotates clockwise by $\Delta\theta$ (FIG. 1) in accordance with changes in the magnitude of the counterclockwise moment of rotation, it will become necessary for assuring protection against the biting to control the rotation displacement $\Delta\theta$ of the rack 1 within a backlash of the gearing.

Figure 3:
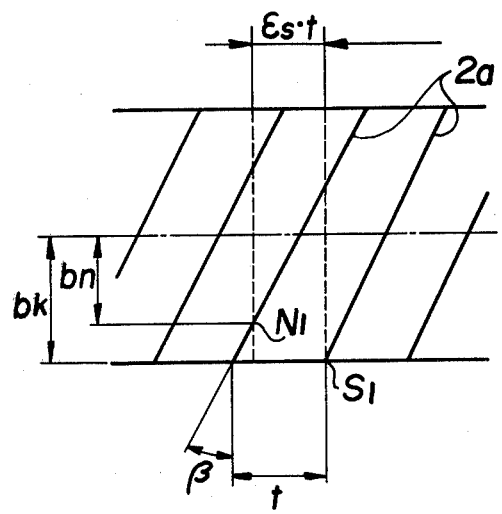
FIG. 3 is an explanatory view showing the intermeshing of rack and pinion for a transverse contact ratio less than 1.

The afore-mentioned relation (4) is based on the assumption that the tranverse contact ratio $\epsilon_s$ is smaller than 1, i.e., as shown in FIG. 3, where the next adjacent helical gear-tooth starts meshing with a corresponding new spiral gear-tooth from its contact point $s_1$ while the contact point of the preceding helical gear-tooth 2 still remains in meshing engagement. The aforesaid requirement for producing counterclockwise moment of rotation should also be met at a point $N_1$ which represents an apparent contact point of the preceeding gear-tooth 2 as viewed as in the tranverse direction. This case will now be discussed with reference to FIGS. 1 and 3.

Since the normal base pitch is $\pi m_n$, the rack 1 has a transverse pitch $t = \pi m_n / \cos \beta$. On the other hand, the tranverse contact ratio is $\epsilon_s$, its apparent transverse pitch becomes $t_1 = \epsilon_s t = \epsilon_s \pi m_n / \cos \beta$. Therefore, in FIG. 3, $$b_n = b_k - \frac{t - t_1}{\tan \beta}$$

$$= b_k - \frac{(1 - \epsilon_s)t}{\tan \beta} \left( \text{where } t = \frac{\pi m_n}{\cos \beta} \right)$$

Substituting this $b_n$ into the $b_k$ in the afore-stated relation (2) and using $b_k = \sqrt{L_k^2 - R_k^2}$, $$\left\{ \sqrt{L_k^2 - R_k^2} - \frac{(1 - \epsilon_s)t}{\tan \beta} \right\} - R_k \frac{\sin \beta}{\tan \alpha_n} \geq 0 \quad (5)$$

Thus, when the parameters $L_k$, $R_k$, $\beta$ and $\alpha_n$ satisfy the above relation (5), the rack can be free from inclination or rocking about the axis w even for a transverse contact ratio $\epsilon_s < 1$.

A distance $b_{k1}$ between a line ef and the contact point $s_2$ which gives rise to no moment of rotation about the axis w becomes equal to $b_k$ when substituting $l_1 = 0$ into the relation (1), thus $$b_{k1} = R_k \frac{\sin \beta}{\tan \alpha_n}.$$

As understood from the foregoing, when the relations (4) and (5) are satisfied for $\epsilon_s = 1$ and $\epsilon_s < 1$, respectively, the rack 1 is kept free from the inclination and rocking and thus the biting. When the rack 1 moves along the direction B' with the pinion rotating about its axis in the direction A' in FIG. 2, the relation among the structural parameters can be similarly examined.

An example of designing a rack and pinion gearing based on the above relations will now be described for $\epsilon_s = 1$.

Figure 5:
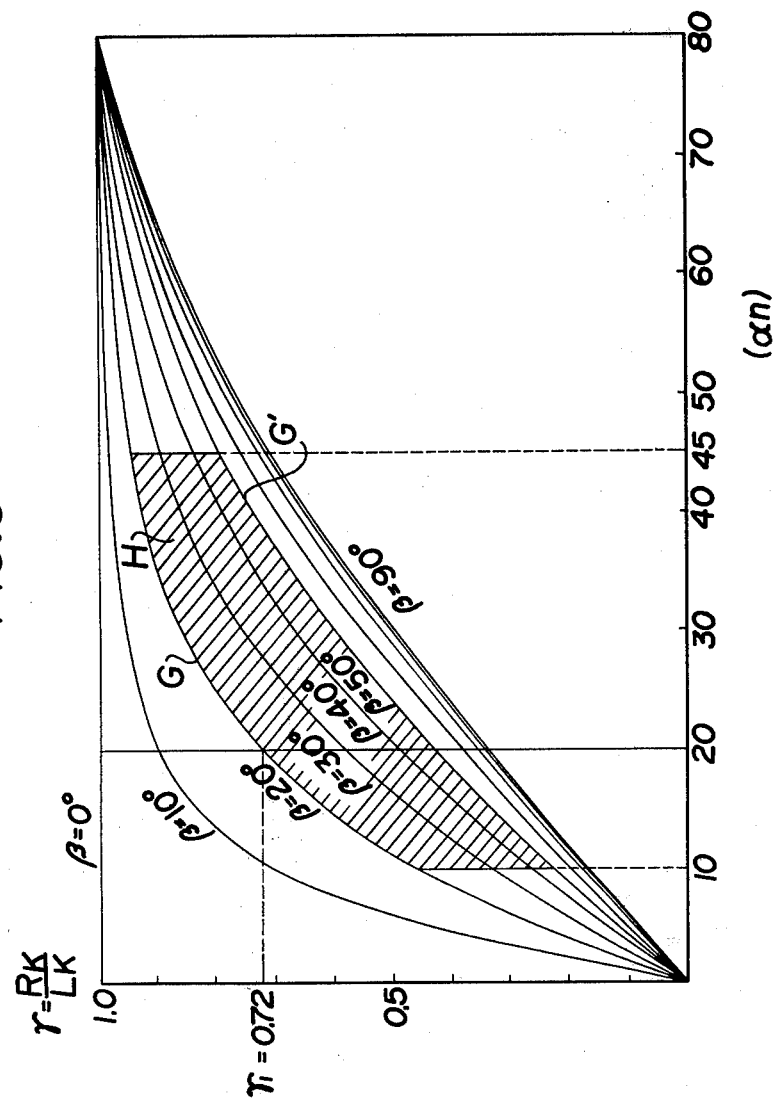
FIG. 5 is a graph for use in design of the rack.
Figure 6:
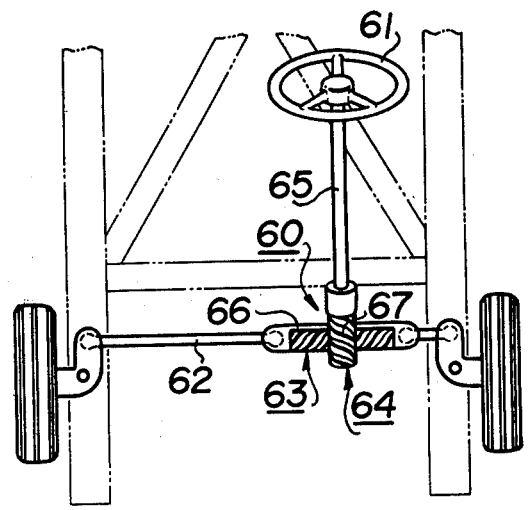
FIG. 6 is a view showing a rack and pinion gearing as used for a steering mechanism.

FIG. 5 is a graph showing $$\gamma = \sqrt{\frac{1}{1 + \left( \frac{\sin 20°}{\tan \alpha_n} \right)^2}} \quad \left( \text{where } \gamma = \frac{R_k}{L_k} \right)$$

against the pressure angle $\alpha_n$ for varieties of helix angles.

When assuming $\alpha_n = 20°$ and $\beta = 20°$, $\gamma_1 = 0.72$ from a curve G. In accordance with the present invention, therefore, when the parameters $L_k$ and $R_k$ are determined according to the relation (4) so that $\gamma \leq 0.72$ and a rack is hobbed with such parameters, the rack can be kept free from inclination or rocking abouts its axis. It will be understood that many preferable sets of $L_k$ and $R_k$ are selectable from the view point of practical use, providing that $R_k / L_k \leq 0.72$ in the above case.

Theoretically, in the case $\beta = 20°$, $\gamma$ and $\alpha_n$ are selectable from all area lying under the curve G showing $$\gamma = \sqrt{\frac{1}{1 + \left( \frac{\sin 20°}{\tan \alpha_n} \right)^2}}.$$

However, practically, it is desirable to determine $\gamma$ (namely $L_k$ and $R_k$) and $\alpha_n$ so that they fall within a dashed area H in FIG. 5, which is defined by $10° \leq \alpha_n \leq 45°$ and $$\gamma \geq \sqrt{\frac{1}{1 + \left( \frac{\sin 50°}{\tan \alpha_n} \right)^2}}$$

under the curve G.

Therefore, when considering practical problems in manufacturing and operation, it is preferable to form the rack with a helix angle $\beta$ of $20° \sim 50°$ and a pressure angle $\alpha_n$ of $10° \sim 45°$, and the ratio $\gamma$ should be found within the dashed area confined by the curves G and G' in FIG. 5.

As clear from the foregoing, by restricting the structure of rack into a form according to the invention from the view point of applied kinematics, it becomes possible to obtain a rack and pinion gearing which is free from inclination and rocking about the axis of rack and thus the biting. Particularly when the rack and pinion gearing is applied to a rack and pinion type power steering mechanism of vehicles, it further becomes possible to manufacture the steering mechanism with reduced numbers of elements and production processes, simplified work and cheaper cost. In addition, it still becomes possible to enjoy extremely smooth steering operation even in the time of starting as well as during traveling, thus to maintain a comfortable feeling of drive.

What is claimed is:

1. A rack having a substantially cylindrical body, and pinion gearing comprising a helical rack and a spiral pinion, wherein said helical rack meets the following relation:

$$\frac{R_k}{L_k} \leq \sqrt{\frac{1}{1 + \left( \frac{\sin \beta}{\tan \alpha_n} \right)^2}}$$

where,
$L_k$ = the radius of said helical rack,
$R_k$ = the distance from the axis to the tooth crest of said helical rack,
$\beta$ = the helix angle of the gear-teeth of said helical rack, and
$\alpha_n$ = the pressure angle of the gear-teeth of said helical rack.

2. A rack and pinion gearing according to claim 1, wherein said $L_k$, $R_k$, $\beta$ and $\alpha_n$ are determined to meet the following relation:

$20° \leq \beta \leq 50°$, $10° \leq \alpha_n \leq 45°$, and $$\sqrt{\frac{1}{1 + \left( \frac{\sin 50°}{\tan \alpha_n} \right)^2}} \leq \frac{R_k}{L_k} \leq \sqrt{\frac{1}{1 + \left( \frac{\sin 20°}{\tan \alpha_n} \right)^2}}$$

3. A rack and pinion gearing according to claim 1, wherein a transverse contact ratio $\epsilon_s$ is less than 1, said helical rack being so formed that said $L_k$, $R_k$, $\beta$ and $\alpha_n$ meet the following relation:

$$\left\{ \sqrt{L_k^2 - R_k^2} - \frac{(1 - \epsilon_s)t}{\tan \alpha_n} \right\} - R_k \frac{\sin \beta}{\tan \alpha_n} \geq 0$$

where t is transverse pitch.

* * * * *